US009755497B2

United States Patent
Townsend et al.

(10) Patent No.: US 9,755,497 B2
(45) Date of Patent: Sep. 5, 2017

(54) MULTI-LEVEL POWER CONVERTER AND A METHOD FOR CONTROLLING A MULTI-LEVEL POWER CONVERTER

(71) Applicant: ABB SCHWEIZ AG, Baden (CH)

(72) Inventors: Christopher Townsend, Newcastle (AU); Hector Zelaya De La Parra, Västerøs (SE)

(73) Assignee: ABB SCHWEIZ AG, Baden (CH)

( * ) Notice: Subject to any disclaimer, the term of this patent is extended or adjusted under 35 U.S.C. 154(b) by 0 days.

(21) Appl. No.: 15/116,466

(22) PCT Filed: Feb. 3, 2014

(86) PCT No.: PCT/EP2014/052054
§ 371 (c)(1),
(2) Date: Aug. 3, 2016

(87) PCT Pub. No.: WO2015/113642
PCT Pub. Date: Aug. 6, 2015

(65) Prior Publication Data
US 2017/0187276 A1     Jun. 29, 2017

(51) Int. Cl.
*H02M 1/084*        (2006.01)
*H02M 7/00*        (2006.01)

(52) U.S. Cl.
CPC ............. *H02M 1/084* (2013.01); *H02M 7/00* (2013.01)

(58) Field of Classification Search
CPC ............... H02M 3/1584; H02M 3/285; H02M 3/33561; H02M 3/33569; H02M 3/3376;
(Continued)

(56) References Cited

U.S. PATENT DOCUMENTS 7,679,941 B2 * 3/2010 Raju ..................... H02M 7/217
 363/37
2007/0279957 A1 * 12/2007 Oohashi ................ H02M 7/483
 363/132
(Continued)

FOREIGN PATENT DOCUMENTS

CN     102420533 A     4/2012
CN     102522913 A     6/2012
(Continued)

OTHER PUBLICATIONS

Manjrekar et al., "Hybrid Multilevel Power Conversion System: A Competitive Solution for High-Power Applications", XP-001125733, IEEE Transaction on Industry Applications, vol. 36, No. 3, May/Jun. 2000, pp. 834-841.
(Continued)

*Primary Examiner* — Jue Zhang
*Assistant Examiner* — Kevin H Sprenger
(74) *Attorney, Agent, or Firm* — Birch, Stewart, Kolasch & Birch, LLP

(57) ABSTRACT

A multi-level power converter includes switching cells, each comprising switching devices and an energy storage element. The switching cells include switching cells of a first type and switching cells of a second type. The converter includes, for each phase, a first arm of serial connected switching cells and a second arm of serial connected switching cells, which first arm and second arm are connected in parallel. The first arm includes more switching cells of the first type than switching cells of the second type and the second arm includes more switching cells of the second type than switching cells of the first type. The switching cells of the first type have lower conduction loss than the switching cells of the second type. The converter is arranged so that a (Continued)

larger current flows through the first arm than the second arm.

20 Claims, 6 Drawing Sheets

(58) Field of Classification Search
CPC .... H02M 3/33523; H02M 7/493; H02M 7/00; H02M 7/49; H02M 7/53806; H02M 7/537; H02M 7/003; H02M 7/5387; H02M 7/538; H02M 7/53871; H02M 1/084; H02J 1/102; H02J 3/46; Y02B 70/126
USPC .............................. 363/65, 71–72, 131–132
See application file for complete search history.

(56) References Cited

U.S. PATENT DOCUMENTS

| 2011/0018481 | A1  | 1/2011  | Hiller   |          |
|--------------|-----|---------|----------|----------|
| 2012/0307540 | A1  | 12/2012 | Tagome   |          |
| 2013/0223115 | A1* | 8/2013  | Tsuchiya | H02M 7/49 363/68 |
| 2014/0049230 | A1* | 2/2014  | Weyh     | H02M 7/483 323/207 |
| 2015/0009731 | A1* | 1/2015  | Kim      | H02M 7/49 363/59 |
| 2015/0333654 | A1* | 11/2015 | Song     | H02M 7/49 363/89 |
| 2016/0056728 | A1* | 2/2016  | Zhang    | H02M 7/487 363/127 |

FOREIGN PATENT DOCUMENTS

| CN | 102545675 A    | 7/2012  |
|----|----------------|---------|
| EP | 1137160 A2     | 9/2001  |
| JP | 2012-175848 A  | 9/2012  |
| WO | WO 99/41828 A1 | 8/1999  |
| WO | WO 2010/149200 A1 | 12/2010 |
| WO | WO 2011/012171 A1 | 2/2011 |
| WO | WO 2011/050847 A1 | 5/2011 |
| WO | WO 2011/113492 A1 | 9/2011 |
| WO | WO 2013/053399 A1 | 4/2013 |
| WO | WO 2013/097906 A1 | 7/2013 |
| WO | WO 2013/120528 A1 | 8/2013 |

OTHER PUBLICATIONS

Sato et al., "Hybrid PWM Rectifiers to Reduce Electromagnetic Interference", XP010610171, IEEE Service CE, vol. 3, Oct. 13, 2002, pp. 2141-2146.

* cited by examiner

MULTI-LEVEL POWER CONVERTER AND A METHOD FOR CONTROLLING A MULTI-LEVEL POWER CONVERTER

FIELD OF THE INVENTION

The present invention relates to a multi-level power converter for one or more phases. The converter comprises a plurality of switching cells each comprising a plurality of switching devices and an energy storage element. The switching devices are arranged to selectively provide a connection to the energy storage element. The converter further comprises a controller configured to control the switching of the switching devices in the switching cells. The switching cells of the converter are arranged to comprise at least switching cells of a first type and switching cells of a second type. The converter further comprises for each phase a first arm of serial connected switching cells and a second arm of serial connected switching cells. The first arm and second arm are connected in parallel.

The present invention also relates to a method for controlling a multi-level power converter.

PRIOR ART

Multi-level converters are used for converting DC electric power to AC electric power or AC electric power to DC electric power. Multilevel converters are found in many high power applications in which medium to high voltage levels are present in the system.

When forming an AC voltage from a DC voltage, the multi-level converter forms the AC voltage in small voltage steps by means of that the controller accurately controls the switching devices of the switching cells. Thereby, the charging and discharging of the energy storage element of the switching cells are controlled so that the converter outputs the desired AC voltage.

The switching devices of the switching cells are for example integrated gate-commutated thyristor (IGCT), gate turn-off thyristor (GTO) and an insulated-gate bipolar transistor (IGBT). A further example of switching devices is wide-bandgap devices, such as silicon carbide switching devices, aluminum nitride switching devices, gallium nitride switching devices and boron nitride switching devices. The energy storage elements of the switching cells are usually capacitors but also batteries may be used.

The multi-level converters are normally designed using commercially available switching cells in order to provide a cost effective converter. However, the use of such commercially available switching cells has for certain application, such as high voltage application, not an optimal power rating and results in higher switching loss and conduction loss than if optimal switching cells for the converter would be available.

WO2013097906A1 discloses a multi-level converter comprising a plurality of switching cells arranged in arms that are connected in parallel. The switching cells in the arms preferably have identical or near identical quantitative properties.

WO2013053399A1 discloses a multi-level converter comprising a plurality of switching cells of the same type that are arranged in arms connected in parallel. A circulating current is introduced in the arms for balancing of capacitor voltage.

OBJECTS AND SUMMARY OF THE INVENTION

The object of the present invention is to provide a multi-level converter that can be constructed from commercially available switching cells and provide reduced energy loss compared with state of art multi-level converters. In particular, the invention relates to a multi-level converter for medium and high voltage application where conduction loss and switching loss in prior art converters are significant.

This object is obtained by a multi-level power converter as defined by claim 1. The converter is characterized in that the first arm comprises more switching cells of the first type than switching cells of the second type and the second arm comprises more switching cells of the second type than switching cells of the first type, which switching cells of the first type have lower conduction loss than the switching cells of the second type, wherein the converter is arranged so that a larger current flows through the first arm than the second arm.

The larger portion of the current is converted in the first arm of the converter using mainly switching cells of the first type. The switching cells of the first type are suitable for high currents and provide low conduction loss. Thereby, the conduction loss in the converter is reduced. Accordingly, the invention enables manufacturing of a converter with reduced energy loss using commercial available switching cells.

The difference in the properties between the switching cells of the first type and the switching cells of the second type originates from that the switching cells comprises switching devices with different properties. The switching cells may have the same or similar structure.

According to an embodiment of the invention, the converter is arranged so that the converted current of the first arm and the second arm are superimposed into the output current from the converter.

The controller controls the switching of the switching cells of the first and the second arms so that the converted current of the two arms when being superimposed corresponds to the desired converted current. Preferably, the controller is controlled so that the current reference is split between the two arms in such a way as to optimize the capacitor voltage balancing within each arm and also to ensure acceptable harmonic performance. Accordingly, it is ensured that the superposition of the two currents forms a current with low harmonic content.

According to an embodiment of the invention, the current through the first arm and the second arm is set by the switching cell types and the number of switching cells in the first arm and the second arm.

According to an embodiment of the invention, the switching cells of the second type have lower switching loss than the switching cells of the first type.

The smaller portion of the current that requires high switching frequency is converted mainly using switching cells of the second type that have lower switching loss than the switching cells of the first type. Thereby, the switching loss of the converter is reduced. The converted current of the first arm and the second arm is superimposed to the output current from the converter. Accordingly, invention enables manufacturing of a converter with reduced energy loss using commercial available switching cells.

According to an embodiment of the invention, the converter is manufactured of commercially available switching cells.

According to an embodiment of the invention, the controller is configured to control the switching of the switching devices in the switching cells so that the switching devices in the switching cells of the first kind are switched at a lower frequency than the switching devices in the switching cells of the second kind.

The smaller portion of the current is converted mainly using switching cells of the second type, which is used for fine-tuning the smaller portion of the current at a high frequency. The switching cells of the second type are suitable for high switching frequencies and provide low switching loss. Thereby, the switching loss of the converter is reduced. The converted current of the first arm and the second arm is superimposed to the output current from the converter. Accordingly, invention enables manufacturing of a converter with reduced energy loss using commercial available switching cells.

According to an embodiment of the invention, more than two-thirds of the switching cells of the first arm are switching cells of the first type.

According to an embodiment of the invention, all the switching cells of the first arm are switching cells of the first type.

According to an embodiment of the invention, more than two-thirds of the switching cells of the second arm are switching cells of the second type.

According to an embodiment of the invention, all the switching cells of the second arm are switching cells of the second type.

According to an embodiment of the invention, at least two-thirds of the current to each phase flows thought the first arm.

According to an embodiment of the invention, the switching cell of the first type comprises switching devices of one of an integrated gate-commutated thyristor, a gate turn-off thyristor and an insulated-gate bipolar transistor. Switching cells constructed with these switching devices provide low conduction loss and are accordingly suitable for use in the first arm.

According to an embodiment of the invention, the switching cell of the second type comprises a wide-bandgap device, preferably one of a silicon carbide switching device, an aluminum nitride switching device, a gallium nitride switching device, a boron nitride switching device. Switching cell constructed with these switching devices, in particular silicon carbide switching devices, provide low switching loss and are accordingly suitable for use in the second arm.

According to an embodiment of the invention, the switching cells are constructed with at least one of full-bridges, half-bridges and cross connected design.

According to an embodiment of the invention, the first arm and second arm of the converter are arranged in a double chain-link wye structure.

The structure of the converter requires each arm to be rated at full voltage, which results in an increased number of switching cells per-phase-leg compared to a single arm of serial connected switching cells. The arrangement of the converter of the invention in the double-wye structure has the advantage that the number of switching cells will not increase with respect to the standard M2LC because the standard M2LC already requires two arms in each phase of the converter. A further advantage with arranging the converter in a double-wye structure is that a DC circulating current can be introduced to alleviate voltage balance issues due to negative sequence compensation currents.

According to an embodiment of the invention, the first arm and second arm of the converter are arranged in a double chain-link delta structure.

The arrangement of the converter in a double chain-link delta structure has the advantage that a circulating current can be introduced inside the delta structure to alleviate voltage balance issues due to negative sequence compensation currents.

According to an embodiment of the invention, the converter is configured to convert electric power of two or more phase, and where the two or more phases are connected with a common DC link.

The arrangement of the converter with a common DC link has the advantage that it is not necessary to introduce any circulating currents because energy exchange between phases is facilitated by the presence of the common DC link.

The objects of the invention are also provided by a method for controlling a converter according to any of claims 1-12. The method comprises the continuously iterating the steps of:
  receiving information on the present state of at least the first and the second arm of the converter and properties of the power to be converted,
  determining a new state of the first and the second arm on basis of the present state of the first and the second arm of the converter and properties of the power to be converted, and
  transmitting control information to the switching cells of the first arm and the second arm so that the state of the converter is changed to the new state.

According to an embodiment of the invention, the method further comprises:
  determining a new state of the second arm at a higher frequency than for the first arm, and
  transmitting control information to the switching cells of the second arm at a higher frequency than for the first arm.

According to an embodiment of the invention, the method further comprises:
  determining a voltage difference between the energy storage elements of the first arm and the second arm, and
  balancing the voltages of the energy storage elements by introducing a circulating a current within the first arm and the second arm.

According to an embodiment of the invention, the method further comprises:
  balancing voltage within each arm so that the current of the first arm and the second arm form a superimposed current with low harmonic content.

BRIEF DESCRIPTION OF THE DRAWINGS

The invention will now be explained more closely by the description of different embodiments of the invention and with reference to the appended figures.

DETAILED DESCRIPTION OF PREFERRED EMBODIMENTS OF THE INVENTION

Figure 1A:
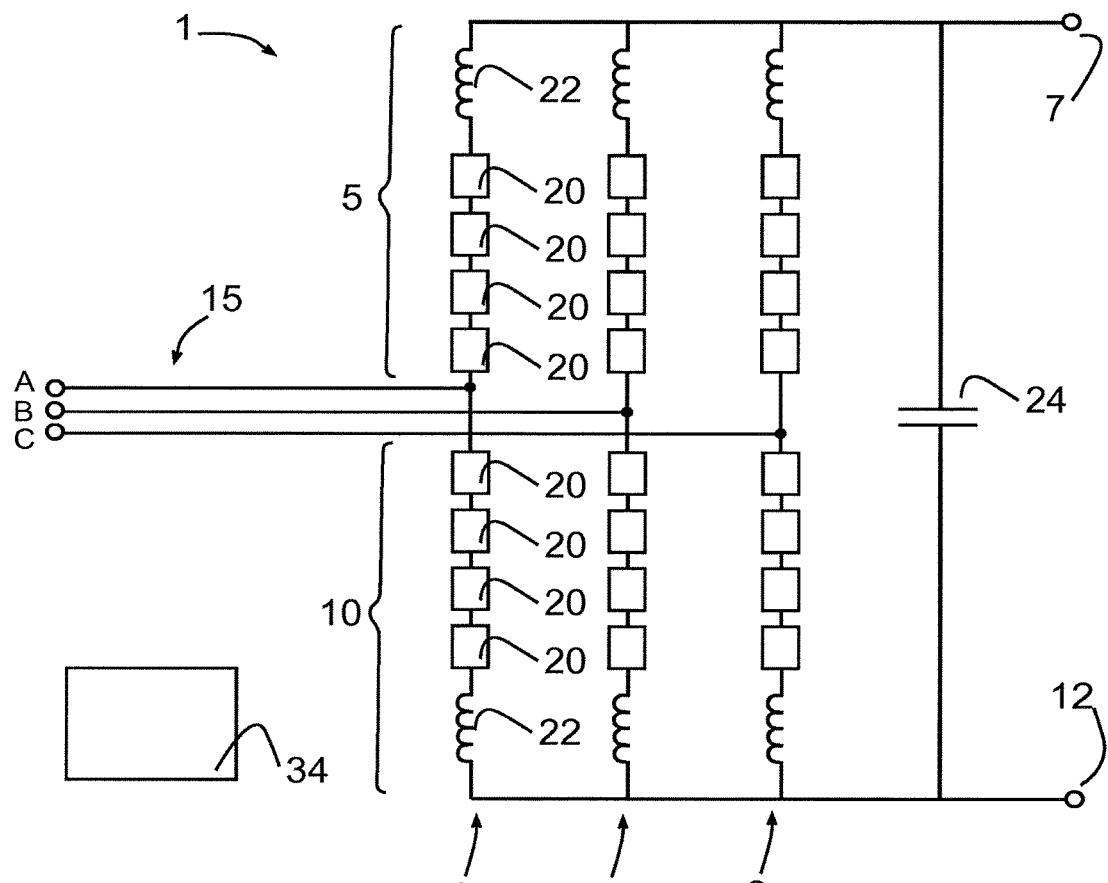
FIG. 1a shows an example of a prior art multi-level power converter for three phases.

FIG. 1 shows an example of a prior art multi-level power converter 1 for converting DC electric power to AC electric power for three phases. The converter 1 comprises an arm 3 for each phase. Each arm 3 comprises an upper arm part 5 connected to an input terminal 7 with first potential of the DC power and a lower arm part 10 connected to an input terminal 12 with a second potential of the DC power. The upper arm part 5 and the lower arm part 10 are connected to an output terminal 15 of the AC power for the respective phase.

Each arm 3 comprises plurality of switching cells 20 connected in serial. In FIG. 1, the upper arm part 5 and the lower arm part 10 each includes four switching cells 20. Each of the upper arm part 5 and the lower arm part 10 also comprises a reactor 22 for reducing flow of transient current between the arms 3. In the disclosed example, a capacitor 24 is connected in parallel to the three arms 3.

Figure 1B:
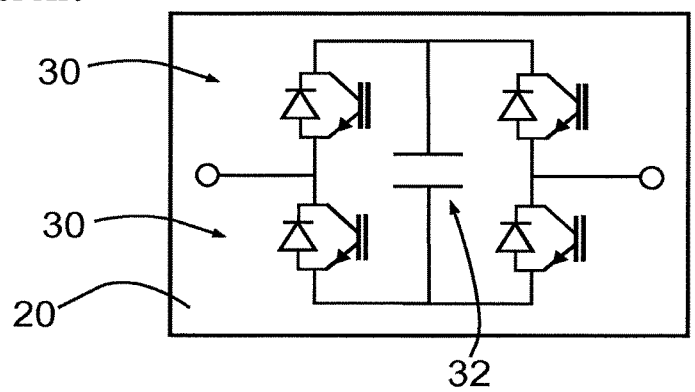
FIG. 1b shows an example of a switching cell for a multi-level power converter.

An example of a switching cell 20 is shown in FIG. 1b. The switching cell 20 comprises a plurality of switching devices 30 and an energy storage element 32. In FIG. 1b the switching cell 20 is a full-bridge switching cell, which consists of four switching devices 30 and an energy storage element 32 in form of a capacitor.

The converter 1 further comprises a controller 34 that is configured to control the switching of the switching devices 30 in the switching cells 20 so the energy storage elements 32 of the switching cells 20 is discharged or charged, wherein the desired AC power is formed.

Figure 2:
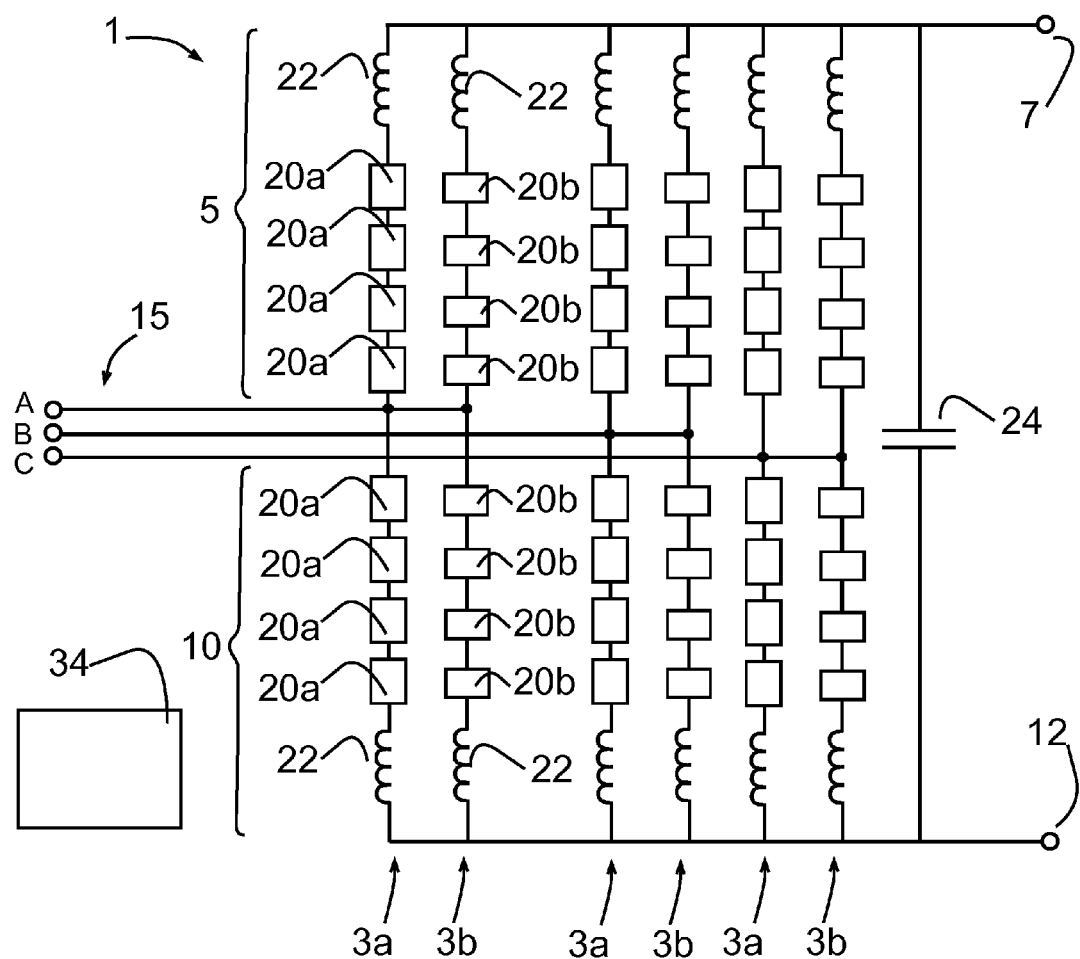
FIG. 2 shows a multi-level power converter for three phases according to an embodiment of the invention.

FIG. 2 shows a multi-level power converter 1 for three phases according to an embodiment of the invention. The converter 1 in FIG. 2 differs from the converter 1 in FIG. 1 in that, for each phase, the converter 1 comprises a first arm 3a and a second arm 3b connected in parallel.

The converter 1 of the invention further differs in that the converter 1 comprises switching cells of a first type 20a and switching cells of a second type 20b. Furthermore, the converter 1 is arranged so that the first arm 3a comprises more switching cells of the first type 20a than switching cells of the second type 20b, and the second arm 3b comprises more switching cells of the second type 20b than switching cells of the first type 20a. In the disclosed embodiment in FIG. 2, all the switching cells 20 of the first arm 3a are switching cells of the first type 20a and all the switching cells 20 of the second arm 3b are switching cells of the second type 20b.

The two types of switching cells 20a, 20b differs in that the switching cells of the first type 20a have lower conduction loss than the switching cells of the second type 20b. Furthermore, the switching cells of the second type 20b have lower switching loss than the switching cells of the second type 20b.

The converter 1 of the invention is arranged so that a larger current flows through the first arm 3a than the second arm 3b. Accordingly, the first arm 3a handles the conversion of a larger portion of the current to be converted and the second arm 3b handles the fine-tuning of a smaller part of the current to be converted. By means of dividing the current into two arms 3a, 3b the overall conversion losses in the converter 1 can be reduced while allowing the converter 1 to be manufactured from commercially available switching cells 20.

Preferably, the switching cells of the first type 20a in the first arm 3a are operated at a lower switching frequency than the switching cells of the second type 20b in the second arm 3b. The first arm 3a is arranged for a less accurate conversion of the main portion of the current and the second arm 3b is arranged for fine-tuning the smaller portion of the current. Thereby, the superimposed converted current from the first arm 3a and the second arm 3b is converted with reduced overall conversion losses while the accuracy of the conversion is maintained.

The switching cells of the first type 20a comprise according to an embodiment switching devices 30 selected from the group of integrated gate-commutated thyristors, gate turn-off thyristors and insulated-gate bipolar transistors. These switching devices are suitable for the first arm 3a because they are adapted for medium and high currents and they result in relatively low conduction loss.

According to an embodiment, the switching devices 30 of the switching cells of the second type 20b are wideband gap devices, preferably silicon carbide switching devices. In particular silicon carbide switching devices have the advantage of providing low switching loss during operation and are accordingly suitable for use in the second arm 3b.

Figures 3A, 3B, 3C:
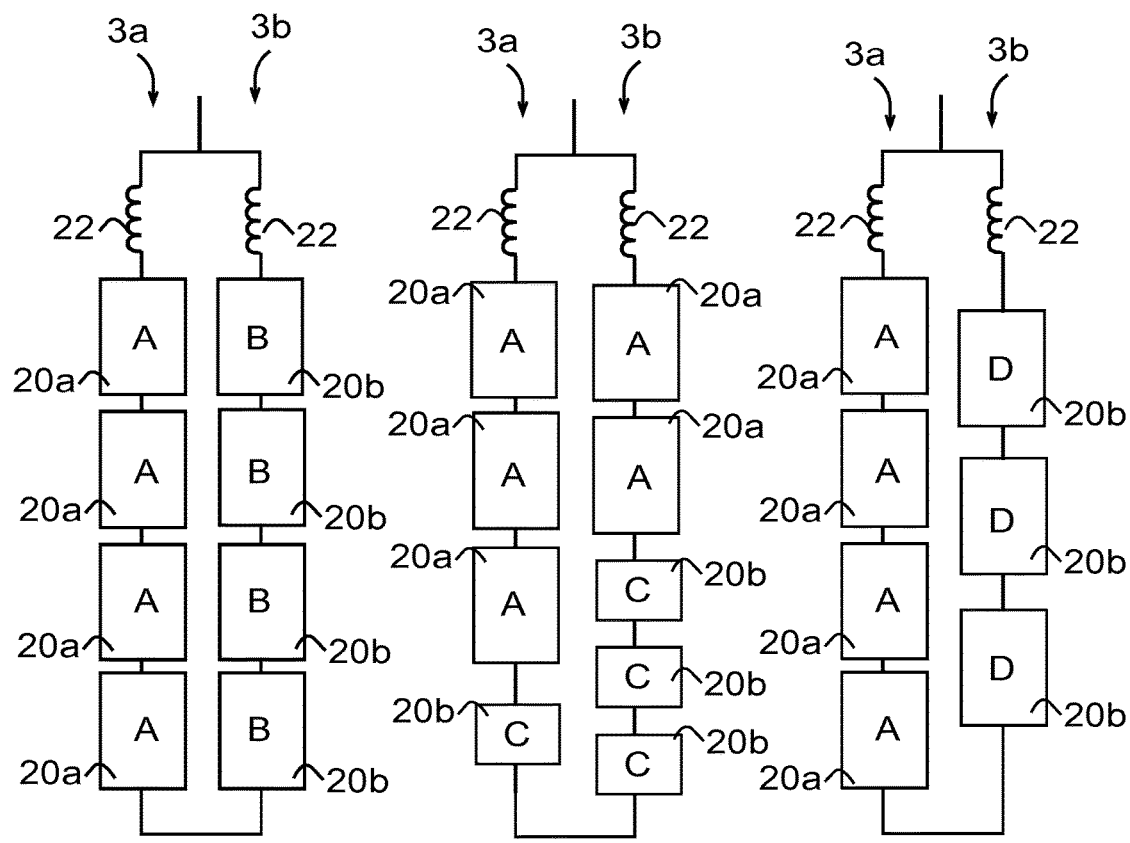
FIG. 3a-c shows three different embodiments of the arrangement of the arms in the converter in FIG. 2.

FIG. 3a-c shows three different embodiments of the arrangement of the arms 3a, 3b in the converter 1 in FIG. 2. In the three embodiments two different switching cells 20 are used in the two arms 3a, 3b.

In FIG. 3a both the first arm 3a and the second arm 3b include four switching cells 20. The switching cell of the first type 20a is designated with capital A and the switching cell of the second type 20a is designated with capital B. The switching cell of the first type 20a relates to a switching cell 20 for medium voltage, high current and low frequency switching. For example voltage larger than 10 kV, current larger than 1.5 kA and switching frequency less than 250 Hz. The switching cell of the second type 20b relates to a switching cell 20 for medium voltage, medium current and medium frequency. For example, voltage larger than 10 kV, current between 0.5 kA and 1.5 kA, and switching frequency between 250 Hz and 1 kHz. In FIG. 3a, all of the switching cells 20 in the first arm 3a are switching cells of the first type 20a and all of the switching cells 20 in the second arm 3b are switching cells of the second type 20b.

In the embodiment shown in FIG. 3b, the same switching cell of the first type 20a designated with capital A is used. However, another switching cell of the second type 20b is used. The switching cell of the second type 20b is designated with capital C and relates to a switching cell 20 for low voltage, medium current and medium switching frequency. For example, voltage less than 1.7 kV, current between 0.5 kA and 1.5 kA, and switching frequency between 250 Hz and 1 kHz. The first arm 3a comprises four switching cells 20, three switching cells A and one switching cell C. The second arm 3b comprises five switching cells 20, two switching cells A and three switching cells C.

In the embodiment shown in FIG. 3c, the same switching cell of the first type 20a designated with capital A is used. However, another switching cell of the second type 20b is used. The switching cell of the second type 20b is designated with capital D and relates to a switching cell 20 for high voltage, low current and high switching frequency. For example, voltage higher than 10 kV, current less than 0.5 kA and switching frequency higher than 1 kHz. All the switching cells 20 in the first arm 3a are switching cells A and all the switching cells 20 in the second arm 3b are switching cells D.

Figure 4:
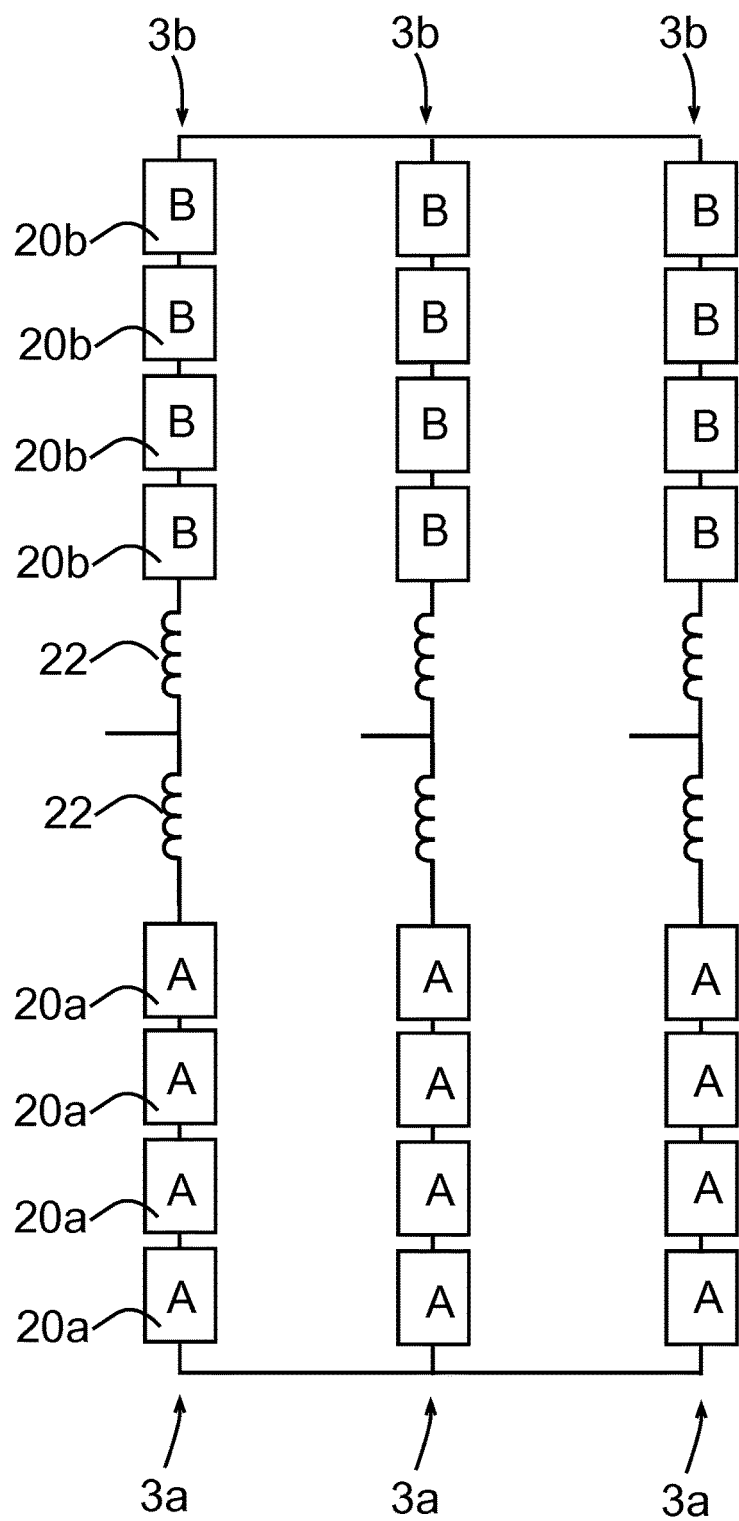
FIG. 4 shows an embodiment of the arrangement of the arms according to the M2LC standard.

FIG. 4 shows an embodiment of the arrangement of the arms 3a, 3b according to the M2LC standard. The arm arrangement is configured for converting three phases. The first arm 3a comprises four switching cells of the first type 20a, which for example are the switching cells A, same as in FIG. 3a, i.e. a switching cell 20 for medium voltage, high current and low frequency switching. The second arm 3b comprises four switching cells of the second type 20b, which for example are the switching cells B, same as in FIG. 3a, i.e. a switching cell 20 for medium voltage, high current and low frequency switching. The first arms 3a are subjected to a higher power rating than the second arms 3b. The arm arrangement shown in FIG. 4 is suitable for the standard M2LC topology because the standard M2LC topology already requires two arms 3a, 3b in each phase of the converter 1. For example, both of the arms 3a, 3b in this embodiment could be constructed with half-bridges.

The advantage of using the M2LC is that a DC circulating current can be introduced to alleviate voltage balance issues due to negative sequence compensation currents. However, the DC circulating current is common to both arms 3a, 3b of the converter 1 and therefore each arm 3a, 3b must be rated to accommodate this current. However, such circulating current would be reasonably small in applications for Flexible AC Transmission Systems (FACTS).

Figure 5:
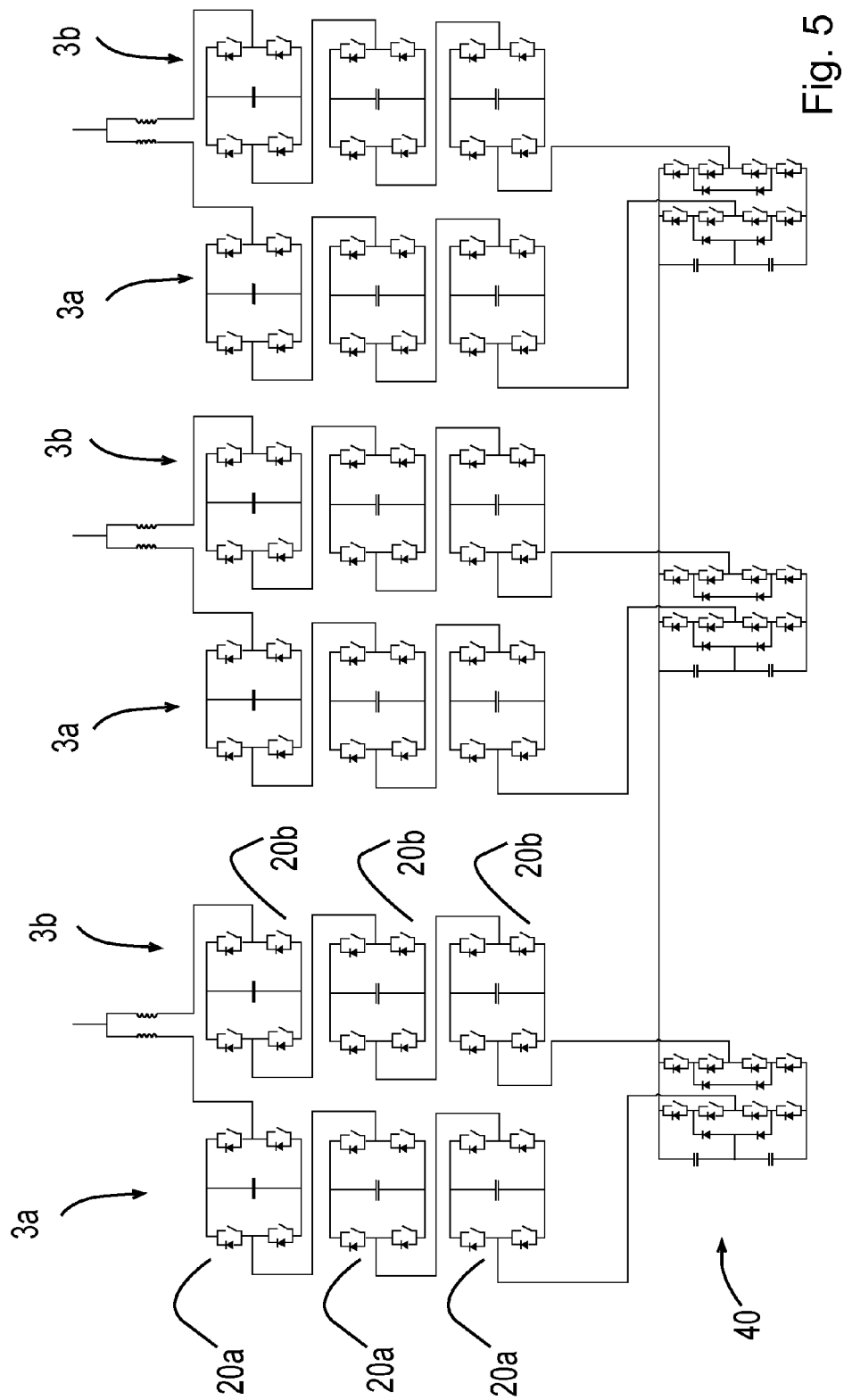
FIG. 5 shows an embodiment of the arrangement of the arms with a common DC link.

FIG. 5 shows an embodiment of the arrangement of the arms 3a, 3b with a common DC link 40. The arrangement in FIG. 5 is configured for three phases and comprises for each phase the first arm 3a and the second arm 3b connected in parallel. The use of a common DC link has the advantage that it is not necessary to introduce any circulating currents because energy exchange between phases is facilitated by the presence of the common DC link.

Figure 6:
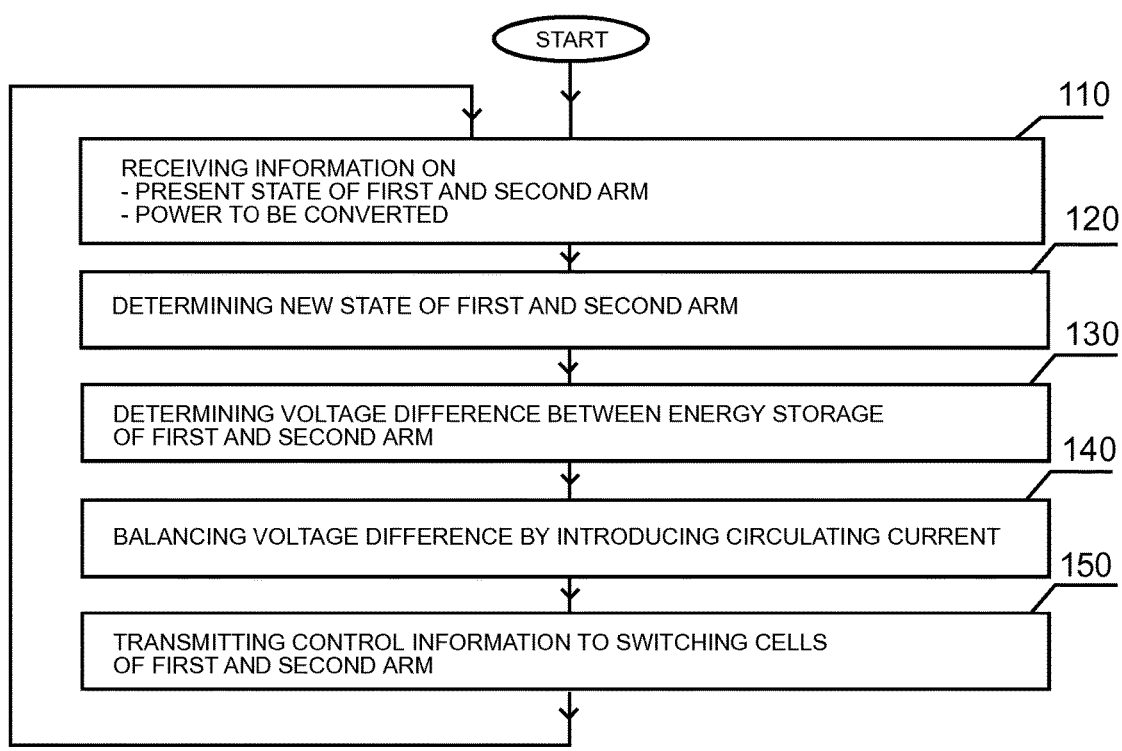
FIG. 6 shows a method for controlling a multi-level power converter according to an embodiment of the invention.

FIG. 6 shows a method for controlling a multi-level power converter 1 according to an embodiment of the invention.

The method is initiated in a step 110 by receiving information on the present state of the first arm 3a and the second arm 3b. The information on the present state of the first arm 3a and the second arm 3b relates to the voltage of each arm 3a, 3b, the voltage of the energy storage device 32 of the switching cells 20 and the state of the switching devices 30 of the switching cells 20. The method further comprises, in a step 110, receiving information on the power to be converted.

The method comprises, in a step 120, determining a new state of the first arm 3a and the second arm 3b. The new states relates to how and which switching devices 30 of the switching cells 20 that is to be changed in order to form the desired output from the converter 1. The new state is determined based on the information received in step 110.

The method comprises, in a step 130, determining the voltage difference between the energy storages 32 of the switching cells 20 of the first arm 3a and the second arm 3b, and in a step 140, the method comprises balancing the voltage difference by introducing a circulating current into the parallel connection of the first arm 3a and the second arm 3b. The balancing of the voltage within each arm 3a, 3b is carried out so that the current of the first arm 3a and the second arm 3b form a superimposed current with low harmonic content.

The method comprises, in a step 150, transmitting control information to the switching devices 32 of the switching cells 20 that need to be changed in order to obtain the new state of the converter 1.

The present invention is not limited to the disclosed embodiments but may be modified within the framework of the claims.

For example, it shall be understood that the invention is not restricted to use of switching cells of the first type 20a and switching cells of the second type 20b for the arms 3a, 3b. Three or more different switching cells 20 may be arranged in the arms 3a, 3b. However, in view of maintenance and modularity of the converter 1, the use of two different types of switching cells 20 is preferable.

Furthermore, it shall be understood that the invention is not restricted to the first arm 3a and the second arm 3b connected in parallel. The converter 1 may be constructed of three or more arms 3 connected in parallel, which arms 3 handle different portion of the current to be converted.

The invention claimed is:

1. A multi-level power converter for one or more phases, the converter comprising:
a plurality of switching cells, each switching cell comprising:
a plurality of switching devices and an energy storage element, which switching devices are arranged to selectively provide a connection to the energy storage element; and
a controller configured to control the switching of the switching devices in the switching cells,
wherein the switching cells comprise at least switching cells of a first type and switching cells of a second type,
wherein the converter comprises, for each phase, a first arm of serial connected switching cells and a second arm of serial connected switching cells, which first arm and second arm are connected in parallel,
wherein the first arm comprises more switching cells of the first type than switching cells of the second type and the second arm comprises more switching cells of the second type than switching cells of the first type, which switching cells of the first type have lower conduction loss than the switching cells of the second type, and
wherein the converter is arranged so that a larger current flows through the first arm and a smaller current flows through the second arm and wherein switching cells of the second type have lower switching loss than the switching cells of the first type, the second arm being configured for fine-tuning of the smaller current flow.

2. The multi-level power converter according to claim 1, wherein the converter is manufactured of commercially available switching cells.

3. The multi-level power converter according to claim 2, wherein the converter is arranged so that the converted current of the first arm and the second arm are superimposed into the output current from the converter.

4. The multi-level power converter according to claim 2, wherein the controller is configured to control the switching of the switching devices in the switching cells so that the switching devices in the switching cells of the first kind are switched at a lower frequency than the switching devices in the switching cells of the second kind.

5. The multi-level power converter according to claim 2, wherein the switching cell of the first type comprises switching devices of one of an integrated gate-commutated thyristor, a gate turn-off thyristor and an insulated-gate bipolar transistor.

6. The multi-level power converter according to claim 1, wherein the converter is arranged so that the converted current of the first arm and the second arm are superimposed into the output current from the converter.

7. The multi-level power converter according to claim 6, wherein the controller is configured to control the switching of the switching devices in the switching cells so that the switching devices in the switching cells of the first kind are switched at a lower frequency than the switching devices in the switching cells of the second kind.

8. The multi-level power converter according to claim 6, wherein the switching cell of the first type comprises switching devices of one of an integrated gate-commutated thyristor, a gate turn-off thyristor and an insulated-gate bipolar transistor.

9. The multi-level power converter according to claim 1, wherein the controller is configured to control the switching of the switching devices in the switching cells so that the switching devices in the switching cells of the first kind are switched at a lower frequency than the switching devices in the switching cells of the second kind.

10. The multi-level power converter according to claim 9, wherein the switching cell of the first type comprises switching devices of one of an integrated gate-commutated thyristor, a gate turn-off thyristor and an insulated-gate bipolar transistor.

11. The multi-level power converter according to claim 1, wherein the switching cell of the first type comprises switching devices of one of an integrated gate-commutated thyristor, a gate turn-off thyristor and an insulated-gate bipolar transistor.

12. The multi-level power converter according to claim 1, wherein the switching cell of the second type comprises a wideband gap device, the wideband gap device being one of a silicon carbide switching device, an aluminum nitride switching device, a gallium nitride switching device and a boron nitride switching device.

13. The multi-level power converter according to claim 1, wherein the switching cells are constructed with at least one of full-bridges, half-bridges and cross connected design.

14. The multi-level power converter according to claim 1, wherein the first arm and second arm of the converter is arranged in a double chain-link wye structure.

15. The multi-level power converter according to claim 1, wherein the first arm and second awl of the converter are arranged in a double chain-link delta structure.

16. The multi-level power converter according to claim 1, wherein the converter is configured to convert electric power of two or more phases, and where the two or more phases are connected with a common DC link.

17. A method for controlling the converter according to claim 1, wherein the method comprises continuously iterating the steps of:
   receiving information on the present state of at least the first and the second arm of the converter and properties of the power to be converted;
   determining a new state of the first and the second arm on basis of the present state of the first and the second arm of the converter and properties of the power to be converted; and
   transmitting control information to the switching cells of the first arm and the second arm so that the state of the converter is changed to the new state.

18. The method according to claim 17, further comprising the step of:
   determining a new state of the second arm at a higher frequency than for the first arm; and
   transmitting control information to the switching cells of the second arm at a higher frequency than for the first arm.

19. The method according to claim 17, further comprising the steps of:
   determining a voltage difference between the energy storage elements of the first arm and the second arm; and
   balancing the voltages of the energy storage elements by introducing a circulating a current within the first arm and the second arm.

20. The method according to claim 17, further comprising the step of balancing voltage within each arm so that the current of the first arm the second arm form a superimposed current with low harmonic content.

* * * * *